March 6, 1962  C. H. CROSBY ET AL  3,023,877
APPARATUS FOR TRANSPORTING REELS
Filed March 9, 1959  5 Sheets-Sheet 1

INVENTORS
C.H.CROSBY
W.T.HICKS
A.L.PIZZI
R.R.WAHLBERG
By W.T. Johnson
ATTORNEY

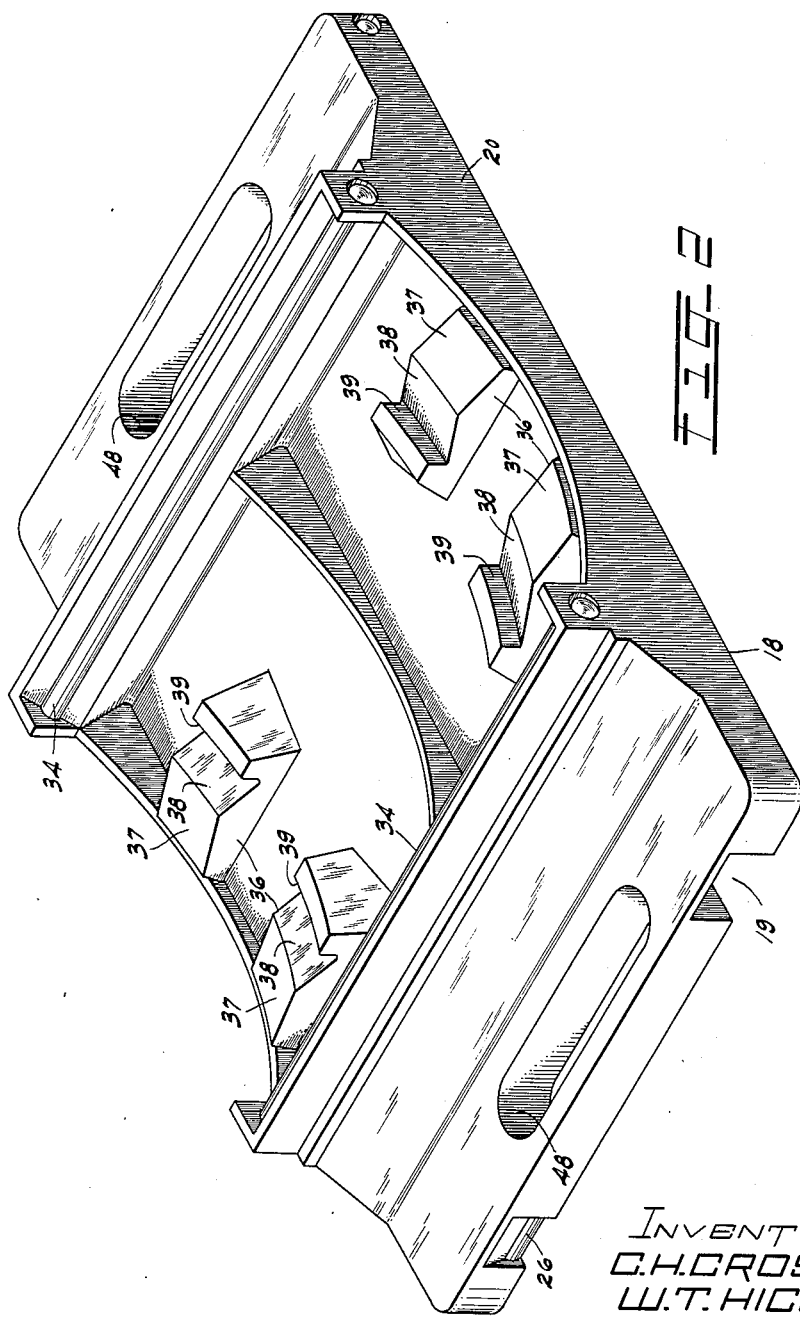

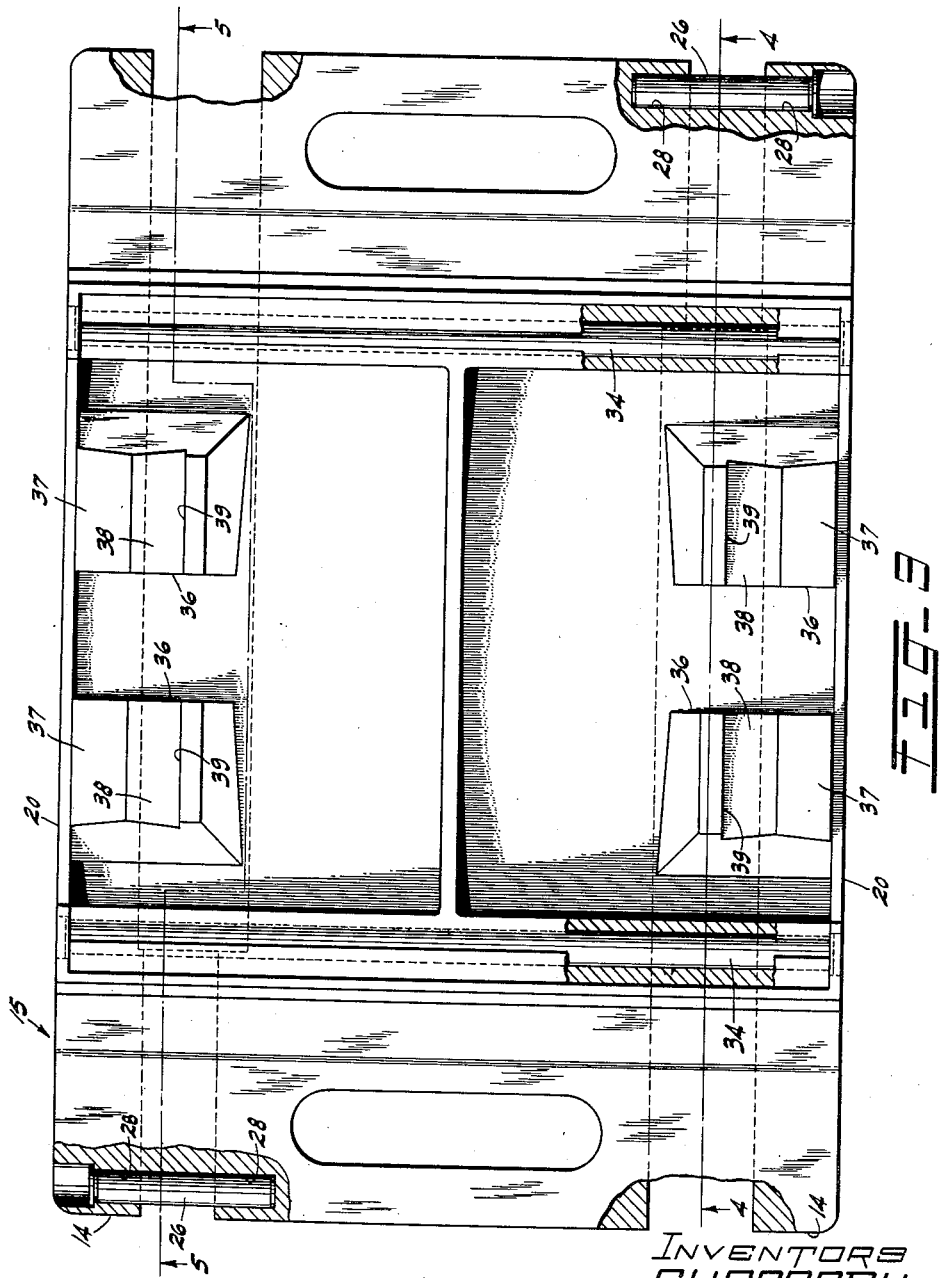

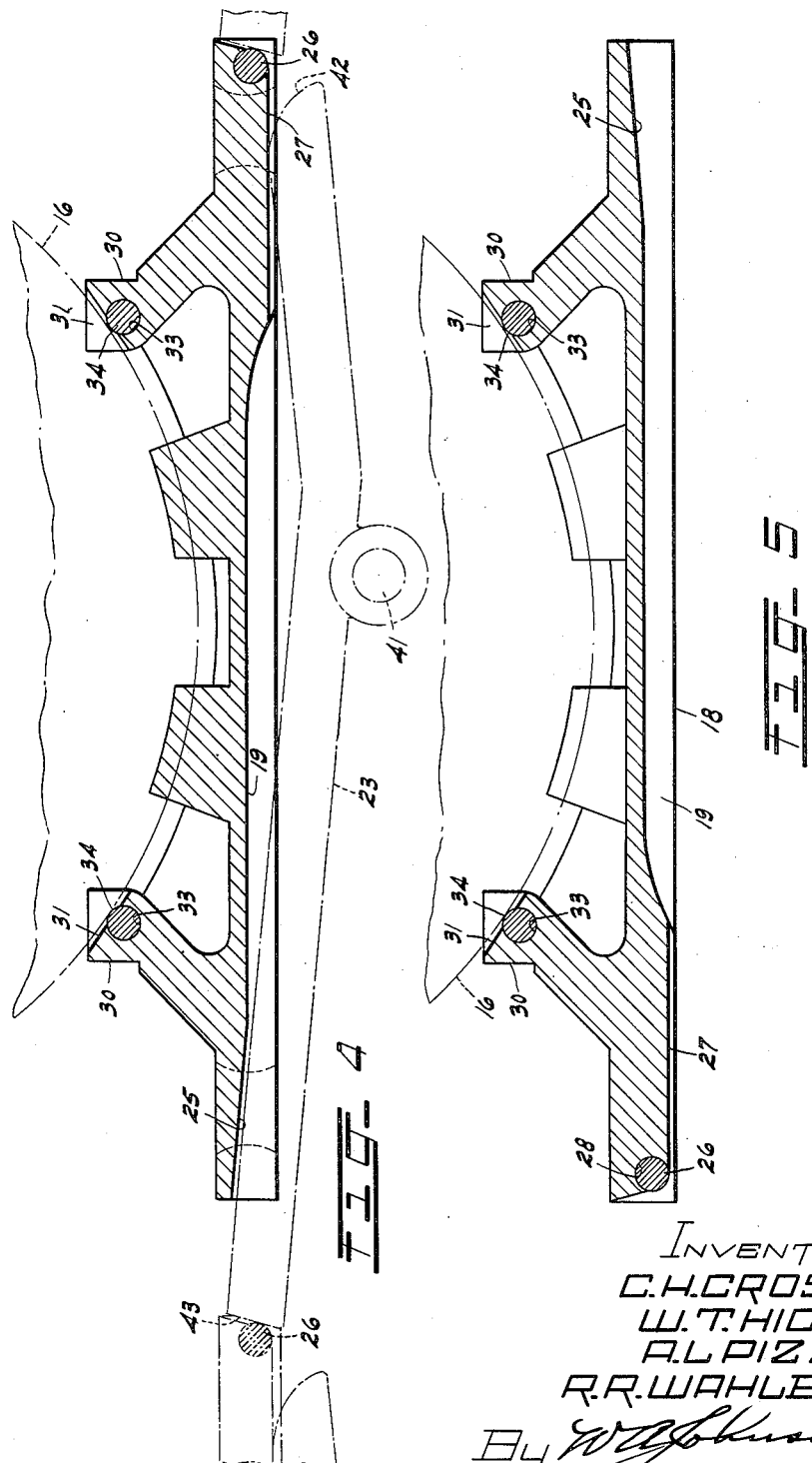

March 6, 1962  C. H. CROSBY ET AL  3,023,877
APPARATUS FOR TRANSPORTING REELS
Filed March 9, 1959  5 Sheets-Sheet 5
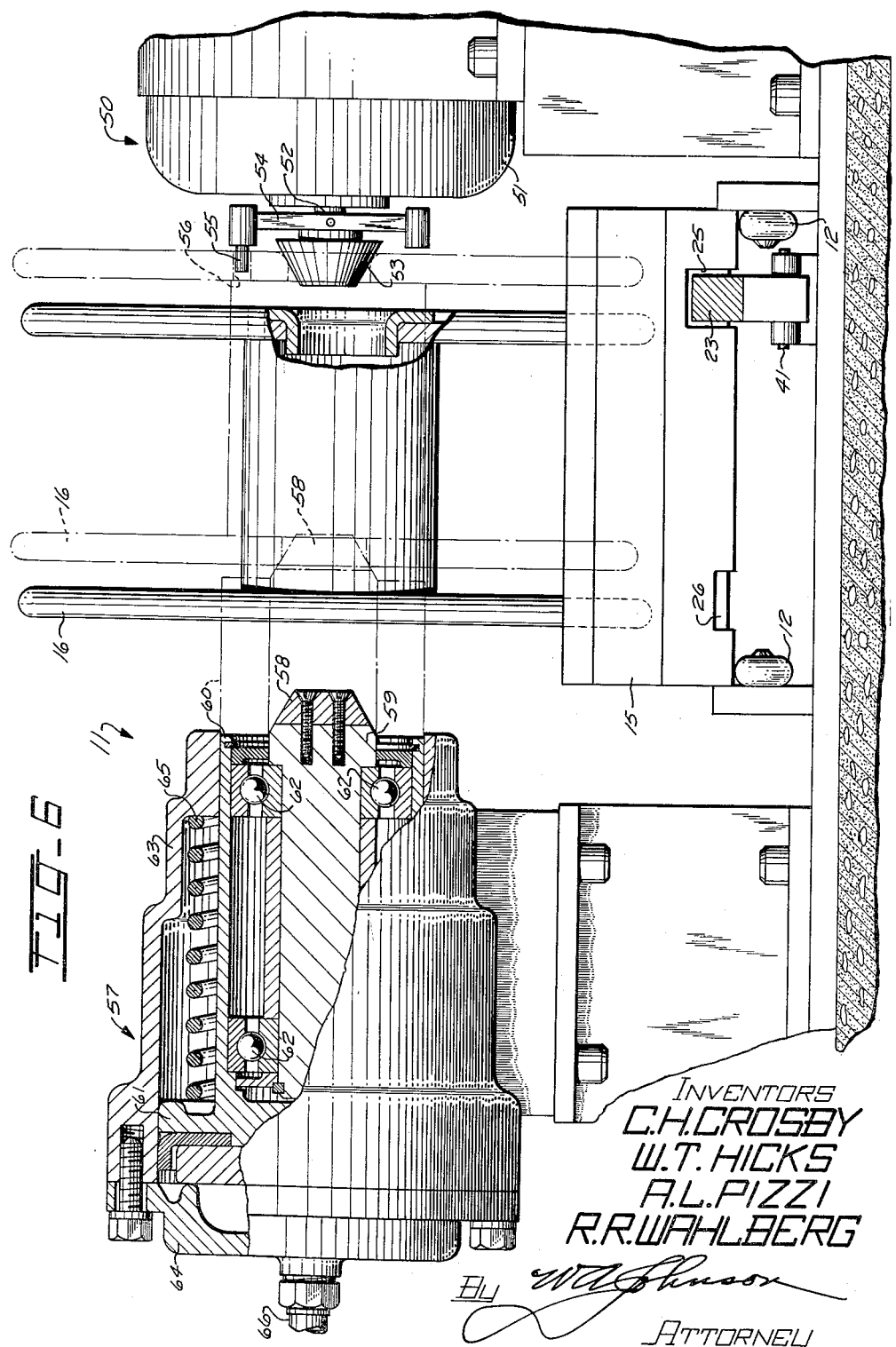
INVENTORS
C.H. CROSBY
W.T. HICKS
A.L. PIZZI
R.R. WAHLBERG
ATTORNEY

3,023,877
APPARATUS FOR TRANSPORTING REELS
Charles H. Crosby, Cranford, William T. Hicks, Glen Rock, Albert L. Pizzi, Union, and Roger R. Wahlberg, Bloomfield, N.J., assignors to Western Electric Company, Incorporated, New York, N.Y., a corporation of New York
Filed Mar. 9, 1959, Ser. No. 798,174
4 Claims. (Cl. 198—34)

This invention relates to apparatus for making cable and particularly to supply stands of the type used with such apparatus and their means for loading reels of strands therein.

In cable forming apparatus, such as cable stranders and stranding cablers, supply stands are provided with reel supporting units for the numerous supply reels for the single or multiple strands to be used in forming cables of various sizes. Owing to the fact that units of various sizes are formed of groups of varied numbers of strands or insulated conductors and the units are brought together to form the cables, supply stands must be provided with numerous rows of supporting units for supporting the reels of strands or conductors. The operating time lost in setting up stranders or stranding cablers for operation depends largely upon the time required for removing empty reels from the supply stands, moving the required number of full reels into the supply stands, locating them with respect to their supporting units and causing operation of the supporting units to position the supply reels for rotation.

The principal object of this invention is a supply stand in which full reels may be quickly and accurately positioned and then removed when desired with minimum loss of time.

According to the invention, the loaded reels are provided with individual pallets and each horizontal row of reels is advanced into position in the stand along a built-in conveyor. An automatic stop locates the leading pallet with its reel in alignment with retracted cone centers for supporting the reel. Each pallet as it moves into its final position actuates a stop for properly positioning the next pallet so that all the reels are in position to be engaged by their cone centers as soon as the last pallet is in place.

More specifically, the movable stops are lever-like elements rotatably supported intermediate their ends, one end of each being positioned to engage a cam of its respective pallet for actuation of each stop, while the other end is moved into a groove of the pallet so as to be located in the path of the following pallet to locate it with respect to its supporting unit.

Other objects and advantages will be apparent from the following detailed description when considered in conjunction with the accompanying drawings wherein:

FIG. 2 is an isometric view of one of the pallets;

FIG. 3 is a top plan view of one of the pallets, portions thereof being shown in section;

FIG. 4 is a vertical sectional view taken along the line 4—4 of FIG. 3;

FIG. 5 is a vertical sectional view taken along the line 5—5 of FIG. 3; and

FIG. 6 is a fragmentary elevational view of one of the reel supporting units.

Figure 1:
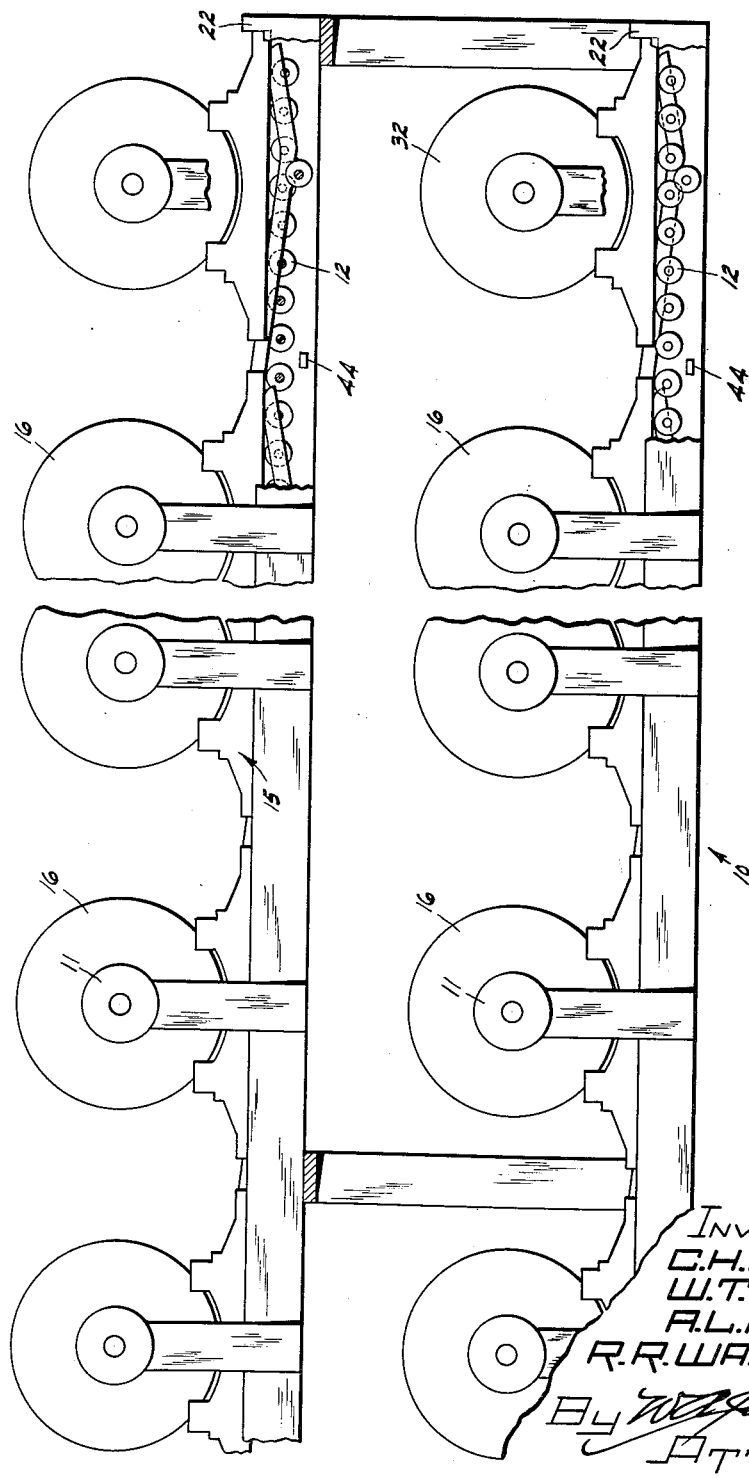
FIG. 1 is a fragmentary side elevational view of a supply stand of a cable strander or a stranding cabler embodying the invention.

In the present illustration, a supply stand indicated generally at 10, FIG. 1, has two upper and two lower rows of supporting units 11 only one row of each being shown. The supporting units 11 are of the type having spaced heads with cooperating cone centers as shown in FIG. 6. The units 11 are mounted at known spaced positions and in general alignment with each other in their respective rows. Due to the fact that the supporting units 11 are identical, a description of the supporting unit shown in FIG. 6 will apply to all supporting units. The supporting unit 11 has a drive head 50 including a motor 51 with a shaft 52 having a cone center 53 mounted thereon. A connector 54 is also fixed to the motor shaft 52 and carries a spring pressed pin 55 receivable in an aperture 56 in either head of any reel to form a driving connection between the drive head 50 and the reel. A driven head 57 of the supporting unit 11 has a cone center 58 mounted on an end of a spindle 59 which is disposed in a hollow portion 60 of a piston 61 and is supported for rotation therein by bearings 62. The piston 61 and its hollow portion 60 are movably disposed in a stationary cylinder 63 which is sealed at one end by a cover 64. A spring 65 normally urges the piston 61 and the associated parts to the left and a connection 66 with a source of air under pressure (not shown) serves to move the piston to the right. Conveyor means 12, in the present instance, includes two rows of rollers mounted in the frame structure of the supply stand 10 to be engaged by outer portions 14 of like pallets 15. The conveyor means is driven in reverse directions by means not shown to advance pallets 15 longitudinally into or out of the supply stand. The conveyors, or the rollers of the conveyors 12, support the pallets 15 for movement in predetermined planes relative to their supporting units 11 and are to locate supply reels 16 so that when full, they may be loaded in their respective supporting units and when empty, may be released from their supporting units and come to rest on their pallets 15.

The pallets 15 are identical in structure and a description of the pallets shown in FIGS. 2 to 5, inclusive, will apply to all of the pallets. The pallet 15 has a flat bottom surface 18 with parallel reversely positioned grooves 19 therein disposed like distances from the sides 20 of the pallet and free of the conveyor rollers 12. The pallet is constructed in this manner so that it may be disposed upon any of the conveyors 12 with either end leading toward a fixed stop 22, FIG. 1, for actuation of movable stops 23. Each groove 19 has a widened or deeper exit end 25 while the entrance end stops short of a cam 26 and a holding member 27.

The cams 26 are hardened steel bars supported for rotation in sockets 28 of the pallet, and the holding members are the top surfaces of grooves cut in the bottom surface of each pallet in planes tangent to their roller cams. Parallel projections 30 of the pallet 15 are grooved at 31 to receive a reel 16 and further grooved or longitudinally apertured at 33 to rotatably receive hardened steel bar-like rollers 34 accessible to and upon which the reel may rotate. Pairs of retaining elements 36 disposed adjacent the sides 20 have outer tapered surfaces 37 for guiding their respective reel heads into or out of the pallet, surfaces 38 slanting downwardly from the surfaces 37 serve in guiding the reel 16 when being mounted in its supporting unit 11 and particularly to guide the reel when released from the unit to cause the reel heads toward their retaining walls 39 which (38—39) cooperate in forming retaiinng pockets to hold the reel against lateral displacement.

The movable stops 23 are identical in structure with the exception of the possible variation in length if at any place in the supply stands there should be a variation in the spacing of the supporting units 11. At this time and in this instance, the movable stop 23 will be of varied length to assure location of the pallet it is to stop in registration with its supporting unit. The movable stop 23 shown in FIG. 4 is rotatably mounted on a spindle 41 disposed intermediate its ends 42 and 43. The location of the spindle 41 is off center with respect to the ends of the movable stop so that in all instances, the pallet engaging ends 43 will rest normally on locating members 44 and will rotate counter-clockwise to these positions when released, causing the ends 43 to be positioned normally out of the path of the pallets and the curved actuating ends 42 to extend upwardly into the path of the pallets.

Each pallet has apertures 48 at each end thereof serving as handles for placing the pallet, by any suitable means such as shown in a co-pending application of Crosby-Dzugan-Hicks-Wahlberg, Serial No. 810,620, filed May 4, 1959, for movement with the reel onto or off of any of the conveyors 12.

*Operation*

In the supply stands, there may be a large number of aligned supporting units 11 requiring a like number of supply reels 16 filled with the proper strands of insulated single or pairs of conductors for use in making a cable. The pallets loaded with their supply reels may be moved onto the conveyor 12 and advanced toward the stop 22. It is apparent, by viewing FIG. 6, that the heads 50 and 57 of the reel supporting units 11 are spaced from each other during movement of the reels 16 with their pallets 15 on the conveyor 12. Spacing of the pallets while they are being moved into the stands on the conveyors is not important as each preceding pallet will operate the movable stops to locate the ends 43 thereof in its groove 19 and in the path of the next pallet to cause spacing of the pallets before they reach their supporting units 11. The movement of each pallet to move the groove 19 in registration with the end 42 of each movable stop 23 permits rocking movement of the stops to lower the ends 43 free of the following pallets.

In following one of the pallets, for example, the leading pallet, its cam 26 will rock each movable stop 23 about its pivot 41, but this action will not stop the leading pallet nor interfere with subsequent pallets if spaced a suitable distance behind. The grooves 19, in each pallet, permit each movable stop 23 to rock counter-clockwise as soon as the end 42 leaves the holding portion 27 and enters the groove to locate the end 43 out of the path of the oncoming subsequent pallet. This action continues until the leading pallet engages the stop 22 at which time its movable stop 23 will be rocked by the cam 26 into the position shown in FIG. 4 and held by the portion 27 to locate its end 43 to be engaged by the cam roller 26 of the following pallet and be stopped thereby. This condition is repeated for each successive pallet so that when all of the pallets have been moved into position, they have caused actuation of their movable stops to jointly cooperate in locating the pallets with their reels in mounting alignment with their supporting units. When all of the pallets 15, with their supply reels 16, have been located between the heads 50 and 57 of their supporting units 11, the air supply means associated with line 66 of each head 57 is operated to cause the piston 61 of each head to move against spring 65 to force the piston and particularly the spindle 59 and the cone center 58 to the broken line position shown in FIG. 6. This action causes all of the reels simultaneously to be moved into the mounting position shown in broken lines in FIG. 6 where the reels will be connected by the pins 55 to the drive heads 50 of the supporting units.

When the reels are mounted in their supporting units, the strands or insulated wires may be withdrawn therefrom to form a cable or cable unit and the pallets are ready to receive the empty or partially empty reels when unloaded from their supporting units. These reels may be removed from the supply stand in somewhat of a reverse manner to that in which they were moved into position on the conveyor. It is advantageous to have the reels empty when removed. Frequently excess strands or wires remain, after forming the last cables, which may be removed by the means shown in the co-pending application of Crosby-Hicks-Wahlberg, Serial No. 798,173, filed March 9, 1959.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In a cable making apparatus, a supply stand having aligned spaced reel supporting units each with spaced reel supporting heads, like pallets for supporting the reels, a conveyor extending longitudinally of the aligned reel supporting units to support the pallets for aligned movement in a given plane thereon relative to the supporting units, a fixed stop for locating the leading pallet in registration with the heads of its supporting unit, lever-like elements pivotally carried by the conveyor at positions disposed between out-of-line actuating and stopping ends of the elements, a cam supported by each pallet and positioned to engage the actuating ends of the elements to pivot the elements to locate the stopping ends of the pivoted elements into stopping positions to stop successive pallets with their reels in registration with the heads of their supporting units, and a holder portion for each pallet disposed adjacent its cam to hold their respective elements with their stopping ends in stopping positions.

2. In a cable making apparatus, a supply stand according to claim 1 in which a rotatable cam is supported by the leading end of each pallet and positioned to engage the actuating end of each element to pivot the elements with their stopping ends in stopping positions, and a holder portion of each pallet having a surface lying in a plane tangential with its rotatable cam to receive the actuating end of its respective element and hold the element with its stopping end in its stopping position.

3. In a cable making apparatus, a supply stand according to claim 1 in which passageways are disposed in each pallet and extend from their respective holder portions to the trailing end of each pallet to free the elements for movement of their stopping ends out of stopping positions.

4. In a cable making apparatus, a supply stand according to claim 3 in which separate means for pivotally supporting the elements and for locating them in general alignment with each other near one side of the plane of movement of the pallets, and two sets of cams, holder portions and passageways for each pallet disposed like distances from each side thereof and in reverse order so that each pallet may have either end as a leading end and actuate the elements.

References Cited in the file of this patent

UNITED STATES PATENTS

| | | |
|---|---|---|
| 1,473,678 | Holmquist | Nov. 13, 1923 |
| 1,492,178 | Nicholas | April 29, 1924 |
| 1,836,815 | Reeves | Dec. 15, 1931 |
| 2,646,226 | Gamble | July 21, 1953 |
| 2,770,350 | Hoffmeister | Nov. 13, 1956 |
| 2,794,532 | Snow | June 4, 1957 |
| 2,813,639 | Verrinder | Nov. 19, 1957 |

FOREIGN PATENTS

| | | |
|---|---|---|
| 375,615 | Great Britain | June 30, 1932 |